(No Model.)
J. ALBEY.
AUTOMATIC GUIDE FOR PAPER MACHINES.
No. 270,718. Patented Jan. 16, 1883.
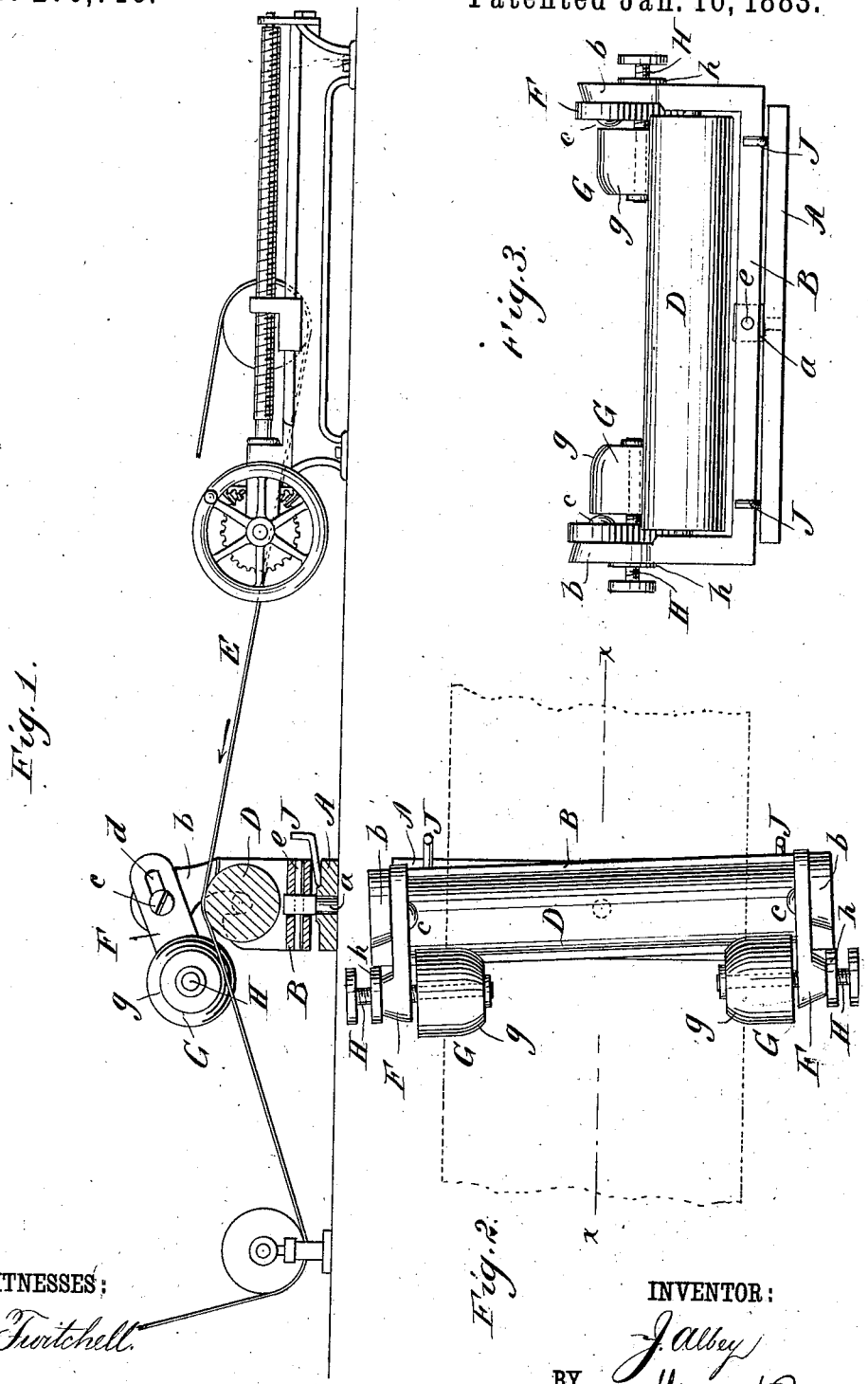
WITNESSES:
Dom Twitchell
C. Sedgwick
INVENTOR:
J. Albey
BY Munn & Co.
ATTORNEYS.

UNITED STATES PATENT OFFICE.

JOHN ALBEY, OF MONTCLAIR, NEW JERSEY, ASSIGNOR TO F. A. WHEELER & CO., OF SAME PLACE.

AUTOMATIC GUIDE FOR PAPER-MACHINES.

SPECIFICATION forming part of Letters Patent No. 270,718, dated January 16, 1883.

Application filed August 29, 1882. (No model.)

*To all whom it may concern:*

Be it known that I, JOHN ALBEY, of Montclair, in the county of Essex and State of New Jersey, have invented a new and Improved Automatic Guide for Paper-Machines, of which the following is a full, clear, and exact description.

Reference is to be had to the accompanying drawings, forming part of this specification, in which similar letters of reference indicate corresponding parts in all the figures.

Figure 1 is a sectional elevation of my invention, taken on the line $x\ x$ of Fig. 2, showing the guide applied to the web of a paper-machine. Fig. 2 is a plan view of the same, and Fig. 3 is a rear elevation of my invention.

The object of this invention is to provide a guide for the webs of paper-machines which will automatically keep the webs in the center of the rollers over which they pass, and thus prevent the edges of the webs from running in contact with the frame of the machine and becoming worn, folded, and cut by such contact.

A is a base-plate, which is adapted to rest upon the frame of the paper-machine, and B is another plate, which is supported centrally, or thereabout, by the pin or stud $a$, which is journaled in a hole in the base-plate A. The plate B is provided at its ends with the upright pieces $b\ b$, and in these upright pieces is journaled the supporting-roller D, over and in contact with which the web E of the paper-machine is adapted to run, as shown Fig. 1. Above the roller D are secured to the uprights $b\ b$, by means of the screws or bolts $c\ c$, the arms F F. These arms are preferably made adjustable and reversible, and this is accomplished by means of the slots $d\ d$ in the arms, through which the screws or bolts $c\ c$ pass, and to the outer ends of these arms, upon the inside, are attached the rollers G G, which are adapted to rest upon the web at its edges, as shown in dotted lines in Fig. 2. These rollers are by preference made adjustable by means of the screw-rods H H, on the inner ends of which the rollers are journaled, and the jam-nuts $h\ h$ are provided for locking the screw-rods H H at any desired position. The stud $a$, as above mentioned, is journaled in a hole made in the base-plate A, and the plate B is attached to the stud by means of the pin $e$, which passes through a transverse hole in the plate and through a hole in the stud, and the plate B is held by the said pin a short distance above the plate A, as shown in Figs. 1 and 2, so that the plate B is adapted to have a slight rocking movement on said pin. J J represent stops attached to the base-plate A for limiting the horizontal pivotal movement of the plate B, which the stud $a$ permits it to have.

The operation of the guide is as follows: The guide having been put in place upon the paper-machines, with the web passing between the rollers G G and the roller D, and the rollers G G having been adjusted by the screw-rods H H so as to properly rest upon the edges of the web, as shown in Fig. 2, dotted lines, the web, if running true over the rollers of the paper-machine, will simply run about midway between the rollers G G, and the friction of the web will be about equal on the two rollers, which will hold the roller D and plate B and the rollers G G at about right angles to the web and parallel with the plate A, as shown in Fig. 1, in which position the guide has no effect upon the web; but in case the web is not running true, one edge of the web will run a greater distance under one of the rollers G than under the other, and the friction of the web will thus be greater on such roller, under which it passes the greater distance, than upon the other, which will cause the roller D and plate B to turn on the stud $a$, the roller G having least friction being carried back, the other being carried forward, as shown in Fig. 2. This movement of the guide will carry the web over toward the rear roller, and thus cause the web to work back to its central position on the rollers of the machine, and this action of the guide will be repeated as often as the web runs out of true in either direction, thus automatically and certainly keeping the web running true and the edges thereof from running in contact with the frame of the paper-machine.

Although I prefer to make the arms F F reversible and adjustable, and the rollers G G adjustable, so as to suit the guide to any sized web and to the direction it may happen to move, it will be understood these adjustments might be omitted. Instead of rounding and chamfering off the inner ends of the rollers G G, as shown at g g, the rollers may be plain cylinders; but the rounded form shown is preferred, since there is no danger of their injuring the web, and although I have shown my invention as applied to paper-machines it will be understood that I do not confine myself to such application, as it may be attached to any machine in or with which webs are used.

I am aware that guide-rolls of paper-machines have been mounted on a middle pivoted frame; but

What I claim as new and of my invention is—

The combination, with the arms F and rolls G, of the rods H, threaded at or near each end, having intermediate journals for the rolls, and provided with locking jam-nuts h h, whereby the rolls G may be adjusted to or from each other over the roll D to suit different widths of web, as described.

JOHN ALBEY.

Witnesses:
EDWARD N. BENHAM,
EDWIN J. HUESTIS.